(12) United States Patent
Lichtinger et al.

(10) Patent No.: US 7,503,417 B2
(45) Date of Patent: Mar. 17, 2009

(54) SENSOR ASSEMBLY FOR SEAT OCCUPANT WEIGHT CLASSIFICATION SYSTEM

(75) Inventors: Harald Lichtinger, Auburn Hills, MI (US); Brian M. Curtis, Orion, MI (US); Robert Graf, Pichl/Gsies (IT); Daniel Reich, Macomb, MI (US); Scott Morrell, White Lake Township, MI (US); Maria Kremer, Pfaffenhofen (DE)

(73) Assignee: Continental Automotive Systems US, Inc., Auburn Hills ( * ) Notice: Subject to any disclaimer, the term of this patent is extended or adjusted under 35 U.S.C. 154(b) by 45 days.

(21) Appl. No.: 11/343,297

(22) Filed: Jan. 31, 2006

(65) Prior Publication Data

US 2006/0124377 A1 Jun. 15, 2006

Related U.S. Application Data

(60) Continuation of application No. 10/603,992, filed on Jun. 25, 2003, now Pat. No. 7,048,085, which is a division of application No. 09/965,390, filed on Sep. 27, 2001, now Pat. No. 6,636,792.

(60) Provisional application No. 60/236,456, filed on Sep. 29, 2000.

(51) Int. Cl.
*B60R 21/015* (2006.01)

(52) U.S. Cl. .................. 180/273; 177/136; 177/144; 280/735; 73/862.391

(58) Field of Classification Search .............. 177/136, 177/144, 210 R; 180/273; 280/735; 701/45; 73/862.391

See application file for complete search history.

(56) References Cited

U.S. PATENT DOCUMENTS 2,708,005 A 5/1955 Gazzo (Continued)

FOREIGN PATENT DOCUMENTS

DE 3809074 C2 3/1992

(Continued)

OTHER PUBLICATIONS

U.S. Appl. No. 09/598,087.

(Continued)

*Primary Examiner*—Randy W Gibson

(57) ABSTRACT

A method and apparatus is provided that classifies a seat occupant into one of several different weight classes based on an estimated value of the seat occupant weight. An occupant's measured weight varies when the occupant's seating position changes or when the vehicle travels over adverse road conditions. A plurality of weight sensors are used to measure the weight exerted by a seat occupant against a seat bottom and are used to determine center of gravity for the seat occupant. A seat belt force sensor is also used to assist in classifying the seat occupant. Compensation factors using the seat belt force and center of gravity information are used to generate an estimated weight value. The estimated value of the occupant weight is compared to a series of upper and lower weight thresholds assigned to each of the weight classes to generate an occupant weight sample class. Over a period of time, several estimated weight values are compared to the weight class thresholds. Once a predetermined number of consistent and consecutive occupant weight sample classes is achieved, the occupant is locked into a specific occupant weight class. When the weight class is locked, the separation value between the upper and lower thresholds is increased to account for minor weight variations due to adverse road conditions and changes in occupant position.

17 Claims, 10 Drawing Sheets

U.S. PATENT DOCUMENTS

| | | | |
|---|---|---|---|
| 3,022,976 A | 2/1962 | Zia | |
| 3,440,602 A * | 4/1969 | Frig | 340/457.1 |
| 3,766,344 A | 10/1973 | Nevett | |
| 4,075,443 A | 2/1978 | Fatur | |
| 5,071,160 A | 12/1991 | White | |
| 5,232,243 A | 8/1993 | Blackburn | |
| 5,413,378 A | 5/1995 | Steffens, Jr. | |
| 5,431,447 A | 7/1995 | Bauer | |
| 5,454,591 A | 10/1995 | Mazur | |
| 5,474,327 A | 12/1995 | Schousek | |
| 5,481,078 A | 1/1996 | Asche | |
| 5,502,284 A | 3/1996 | Meiller | |
| 5,542,493 A | 8/1996 | Jacobson | |
| 5,566,978 A | 10/1996 | Fleming | |
| 5,570,903 A | 11/1996 | Meister | |
| 5,573,269 A | 11/1996 | Gentry | |
| 5,605,348 A | 2/1997 | Blackburn | |
| 5,612,876 A | 3/1997 | Zeidler | |
| 5,618,056 A | 4/1997 | Schoos | |
| 5,624,132 A | 4/1997 | Blackburn | |
| 5,626,359 A | 5/1997 | Steffens, Jr. | |
| 5,664,807 A | 9/1997 | Bohmler | |
| 5,670,853 A | 9/1997 | Bauer | |
| 5,678,854 A | 10/1997 | Meister | |
| 5,732,375 A | 3/1998 | Cashler | |
| 5,739,757 A | 4/1998 | Gioutsos | |
| 5,804,887 A | 9/1998 | Holzapfel | |
| 5,810,392 A | 9/1998 | Gagnon | |
| 5,821,633 A | 10/1998 | Burke | |
| 5,834,646 A | 11/1998 | Kvisteroy | |
| 5,864,295 A | 1/1999 | Jarocha | |
| 5,865,463 A * | 2/1999 | Gagnon et al. | 280/735 |
| 5,906,393 A | 5/1999 | Mazur | |
| 5,967,549 A | 10/1999 | Allen | |
| 5,971,432 A | 10/1999 | Gagnon | |
| 6,000,717 A | 12/1999 | Rayford | |
| 6,015,163 A | 1/2000 | Langford | |
| 6,039,344 A | 3/2000 | Mehney | |
| 6,040,532 A | 3/2000 | Munch | |
| 6,069,325 A | 5/2000 | Aoki | |
| 6,070,115 A | 5/2000 | Oestreicher | |
| 6,079,745 A | 6/2000 | Wier | |
| 6,081,759 A * | 6/2000 | Husby et al. | 701/45 |
| 6,087,598 A | 7/2000 | Munch | |
| 6,092,838 A | 7/2000 | Walker | |
| 6,129,168 A | 10/2000 | Lotito | |
| 6,134,947 A | 10/2000 | Kwun | |
| 6,170,865 B1 | 1/2001 | Barron | |
| 6,179,330 B1 | 1/2001 | Wier | |
| 6,189,946 B1 | 2/2001 | Levin | |
| 6,209,915 B1 * | 4/2001 | Blakesley | 280/801.1 |
| 6,264,236 B1 * | 7/2001 | Aoki | 280/735 |
| 6,282,473 B1 * | 8/2001 | Steffens, Jr. | 701/45 |
| 6,301,977 B1 * | 10/2001 | Stojanovski | 73/862.393 |
| 6,447,010 B1 * | 9/2002 | Curtis et al. | 280/801.1 |
| 6,454,304 B1 * | 9/2002 | Steffens, Jr. | 280/801.1 |
| 2001/0054323 A1 * | 12/2001 | Faigle et al. | |

FOREIGN PATENT DOCUMENTS

| | | |
|---|---|---|
| DE | 4401660 | 7/1995 |
| DE | 19614523 A1 | 10/1996 |
| DE | 19752976 A1 | 3/1997 |
| DE | 19602087 A1 | 7/1997 |
| DE | 19602088 A1 | 7/1997 |
| DE | 19602089 A1 | 7/1997 |
| DE | 19709197 A1 | 10/1997 |
| DE | 19722163 A1 | 12/1997 |
| DE | 4442841 C2 | 2/1998 |
| DE | 19648268 A1 | 5/1998 |
| DE | 19752356 A1 | 5/1999 |
| DE | 19753163 A | 6/1999 |
| DE | 19754166 A1 | 6/1999 |
| DE | 19831750 C1 | 11/1999 |
| DE | 19752822 C2 | 12/1999 |
| DE | 10011371 A1 | 9/2000 |
| DE | 20012950 U1 | 12/2000 |
| DE | 19882950 T1 | 1/2001 |
| DE | 19931379 A1 | 2/2001 |
| EP | 0796768 A1 | 1/1997 |
| EP | 0656283 B1 | 8/1997 |
| EP | 0945316 A2 | 9/1999 |
| EP | 0962362 A2 | 12/1999 |
| EP | 0990565 A1 | 4/2000 |
| EP | 0721863 B1 | 5/2000 |
| EP | 0997358 A2 | 5/2000 |
| EP | 0978426 A2 | 9/2000 |
| JP | 9-150662 | 6/1997 |
| WO | WO98/17508 A1 | 4/1998 |
| WO | WO98/30420 A1 | 7/1998 |
| WO | WO98/49031 A1 | 11/1998 |
| WO | WO98/54638 A | 12/1998 |
| WO | WO98/58821 A1 | 12/1998 |
| WO | WO99/12012 A1 | 3/1999 |
| WO | WO99/24285 A1 | 5/1999 |
| WO | WO99/38731 A1 | 8/1999 |
| WO | WO01/00454 A1 | 1/2001 |
| WO | WO01/18506 A1 | 3/2001 |

OTHER PUBLICATIONS

U.S. Appl. No. 09/648,222.
U.S. Appl. No. 09/853,338.
R. L. Phen, et al.: "Advanced Air Bag Technology Assessment—Final Report", Apr. 1998.

* cited by examiner

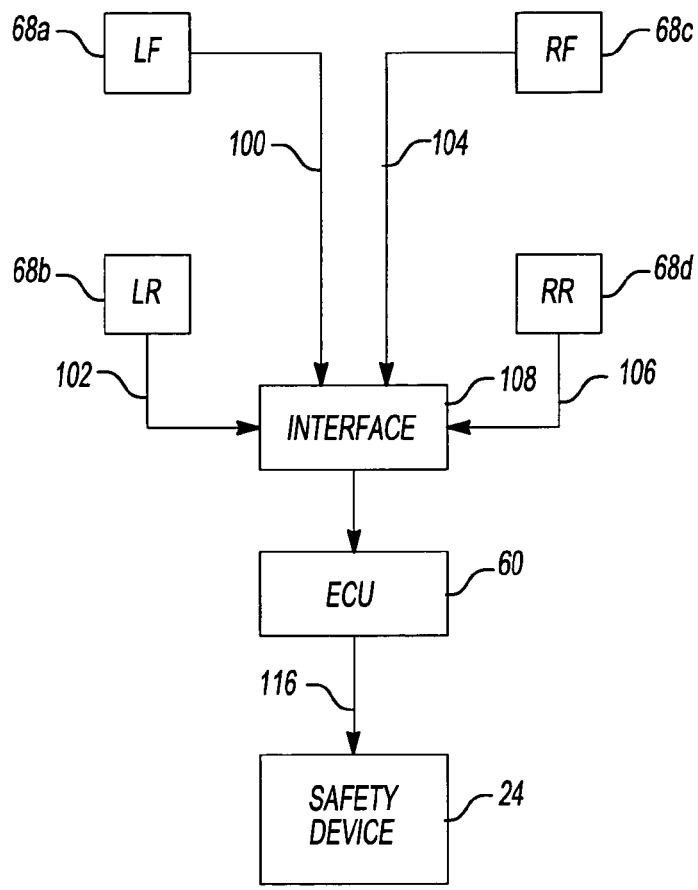
Fig-9
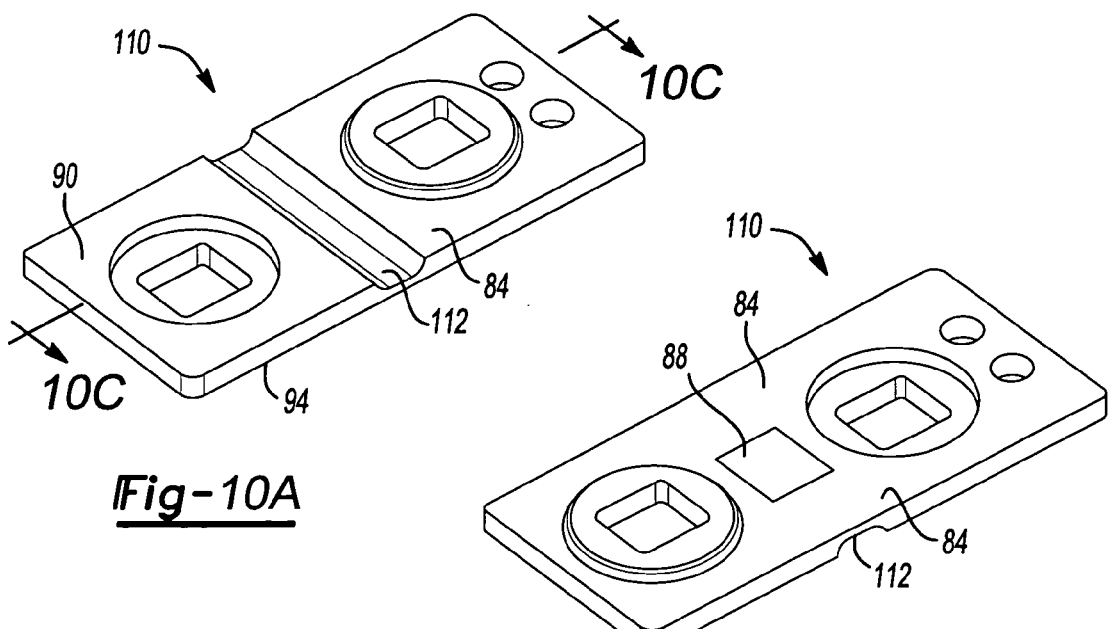
Fig-10A
Fig-10B

SENSOR ASSEMBLY FOR SEAT OCCUPANT WEIGHT CLASSIFICATION SYSTEM

RELATED APPLICATION

This application is a continuation of Ser. No. 10/603,992, filed Jun. 25, 2003, which was a divisional of Ser. No. 09/965,390 filed on Sep. 27, 2001, which claims the benefit of provisional application 60/236,456 filed on Sep. 29, 2000.

BACKGROUND OF THE INVENTION

1. Field of the Invention

This invention relates to a method and apparatus for measuring the weight of a seat occupant and classifying the occupant into a weight class.

2. Related Art

Most vehicles include airbags and seatbelt restraint systems that work together to protect the driver and passengers from experiencing serious injuries due to high-speed collisions. It is important to control the deployment force of the airbags based on the size of the driver or the passenger. When an adult is seated on the vehicle seat, the airbag should be deployed in a normal manner. If there is an infant seat or small adult/child secured to the vehicle seat then the airbag should not be deployed or should be deployed at a significantly lower deployment force. One way to control the airbag deployment is to monitor the weight of the seat occupant.

Current systems for measuring the weight of a seat occupant are complex and expensive. These systems use various types of sensors and mounting configurations to determine seat occupant weight. For example, some systems use pressure sensitive foil mats or a plurality of individual sensors mounted within a seat bottom foam cushion while other systems mount sensors on seat tracks, seat frame members, or other seat structural members. The combined output from the sensors is used to determine the weight of the seat occupant. The accuracy of the weight measurements from these types of sensor systems can be compromised due to additional seat forces resulting from the occupant being secured to the seat with a seatbelt.

For example, weight sensor systems can have difficulty identifying an adult, a child, or a car seat when the seatbelt is being used. When a child seat is secured to a seat with a seatbelt, an excess force acts on the sensors mounted within the rear portion of the seat bottom, which interferes with accurate weight sensing. Over tightening of the seatbelt to securely hold the child seat in place, pulls the child seat down against the rear part of the seat bottom, causing the excessive force measured by the sensors. Due to this effect, the current weight sensing systems have difficulty in discerning between an adult belted to a seat and a child seat secured to the seat with a seatbelt.

In order to address this problem, sensors have been incorporated into the seatbelt to measure the tension force applied to the seatbelt as passengers or a child seat is secured to the seat. High seatbelt tension forces indicate that a child seat is secured to the seat. One disadvantage with current seat belt force sensors is that it is difficult to get accurate seat belt force measurements. Another disadvantage with current seat belt force sensors is that non-axial loading on the belt can affect the accuracy of the force measurement.

Once seat occupant weight force measurements and belt force measurements are taken, the seat occupant is typically classified into a predetermined classification. Some systems attempt to classify seat occupants into predetermined customer-specified classes usually based only on occupant weight. The classification information is then used to modify the deployment of the airbag. These systems do not provide accurate and consistent classification over a wide range of adverse road conditions and/or occupant seating conditions.

The accuracy of the weight measurements from known sensor systems can also be compromised due to variable seat forces resulting from momentary events such as rough road conditions or seat occupants adjusting seat position, for example. These types of events can transfer or remove weight from the seat for short periods of time, which affects the accuracy of the system.

Thus, it is desirable to have an improved seat occupant weight measurement and classification system that provides increased accuracy in weight measurement and classification as well as overcoming any other of the above referenced deficiencies with prior art systems.

SUMMARY OF THE INVENTION

A weight classification system utilizes weight and seat belt force sensors to classify seat occupants into a predetermined weight classification. Preferably, a plurality of weight force sensors are mounted between a seat bottom and a vehicle structure and a seat belt force sensor is installed within a seat belt assembly. The weight sensors are preferably located at four connecting points for the seat frame and pick up all distributed forces (positive and/or negative forces) to determine the total weight on the seat and the center of gravity. The center of gravity and total weight determinations are used to classify the seat occupant, which is further used to control deployment of a safety device, such as an airbag.

In the preferred embodiment, one weight sensor is mounted at each corner of the seat bottom. Each weight sensor includes a bending element having one end mounted to the seat frame and an opposite end mounted to a vehicle or other seat structure such as a riser, seat track, or vehicle floor, for example. At least one strain gage assembly is mounted on a center portion of the bending element and an integrated electronics package electrically connects the strain gage to an electronic control unit (ECU) or other similar device. The strain gages measure deflection of the center portion and generate a weight signal that is sent to the ECU.

Preferably, the bending element includes a top surface and a bottom surface with at least one centrally formed groove in one of the top or bottom surfaces. The groove extends at least partially along the width of the sensor to localize strain in the center portion. The strain gage is placed on the other of the top or bottom surfaces, in an opposing direction from the groove.

Output from the sensors near the front of the seat bottom are combined and compared to output from the sensors near the rear of the seat bottom to determine the center of gravity. The initial seat occupant weight can be adjusted to take into account the center of gravity of the seat occupant. The initial seat occupant weight can also be adjusted to take into account forces exerted on the seat occupant by the seat belt assembly.

The seat belt sensor includes a load cell with a strain gage that is integrated into a seat belt mechanism that is used to secure an occupant to a vehicle seat. When the seat belt is tightened, the sensor is pulled into tension and this is measured by the strain gage. The strain gage measurements and signals are sent to the ECU. The ECU uses the information to determine whether a child seat or an adult is secured to the vehicle seat. Further, the seat belt force information is used to adjust the initial seat occupant weight and is used to properly classify the seat occupant.

The seat occupant is classified into one of several different weight classes based on an estimated value of the seat occupant weight. Each of the weight classes has upper and lower thresholds that define the class. Over time, several comparisons are made between the estimated weight and the thresholds of the weight classes and each comparison results in a weight class sample. The seat occupant is assigned a specific weight class designation once a predetermined number of consistent and consecutive weight class samples is achieved. The specific weight class designation remains locked until a certain number of inconsistent weight class samples are observed.

In a disclosed embodiment of this invention, the method for classifying a seat occupant into a weight class includes the following steps. The seat occupant weight is measured resulting in an estimated weight. The estimated weight is compared to a series of weight classes with thresholds to determine a class sample. The previous steps are repeated until a predetermined number of class samples having the same value is achieved and the class sample becomes locked as the occupant weight class.

Additional steps include generating an occupant weight class signal corresponding to the locked occupant weight class, transmitting the occupant weight class signal to a control unit, and modifying deployment of an airbag based on the occupant weight class signal. The weight class is unlocked when a predetermined number inconsistent class samples is observed. When the class is unlocked, the process repeats.

Once the occupant has been classified into a weight class, that class becomes the known class for the next comparison. Preferably, each weight class is assigned an upper threshold and a lower threshold. At each iteration, the estimated weight is compared to the upper and lower thresholds for the last known weight class. The new class sample is designated the same as the last known weight class if the estimated weight is between the upper and lower thresholds for the last known weight class. The sample is set equal to a next higher weight class if the estimated weight is greater than the upper threshold for the last known weight class or the class sample is set equal to a next lower weight class if the estimated weight is less than the lower threshold for the last known weight class.

In one disclosed embodiment, the value of the upper threshold of the class sample is increased by a first predetermined amount and the value of the lower threshold of the class sample is decreased by a second predetermined amount after the class sample is locked. The upper and lower thresholds are returned to their initial values when the class sample becomes unlocked.

The subject invention uses seat occupant weight and seat belt force measurements in combination with varying weight class thresholds and class sample histories to produce a more stable, accurate and robust classification process that reduces errors caused by changes in occupant seating position and adverse road conditions. The more accurate classification system is used to generate control signals, which are used to modify airbag deployment.

These and other features of the present invention can be best understood from the following specification and drawings, the following of which is a brief description.

BRIEF DESCRIPTION OF THE DRAWINGS

FIG. 9 is a schematic control diagram of the weight sensor and control system.

FIG. 10A is a top perspective view of a weight sensor.

FIG. 10B is a bottom perspective view of the weight sensor of FIG. 10A.

DETAILED DESCRIPTION OF AN EXEMPLARY EMBODIMENT

Figure 1:
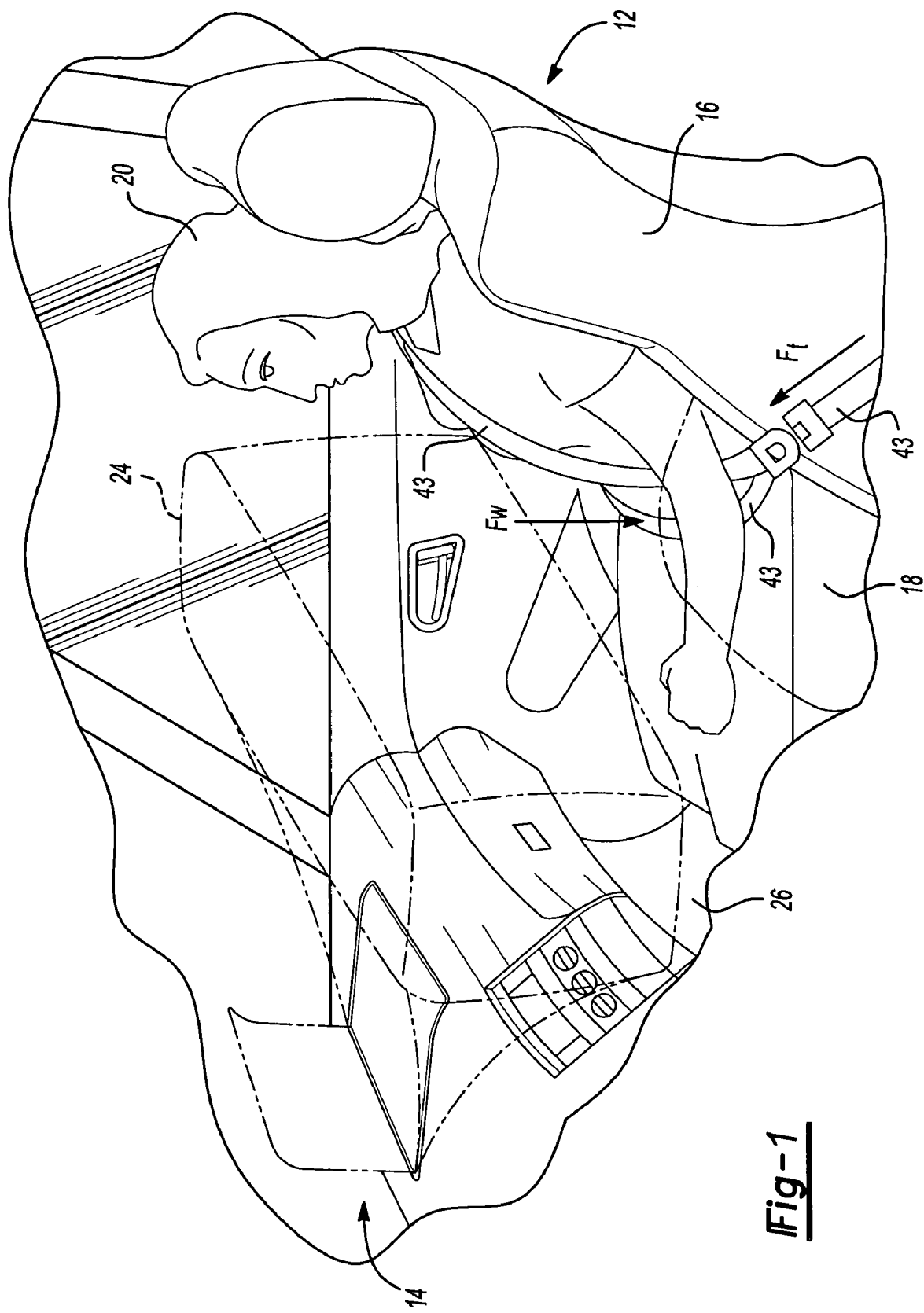
FIG. 1 is a schematic view showing a vehicle with an airbag system and an occupant sitting in a seat with the airbag in an active state shown in dashed lines.

A vehicle includes a vehicle seat assembly, shown generally at 12 in FIG. 1, and an airbag system 14. The seat assembly 12 includes a seat back 16 and a seat bottom 18. A vehicle occupant 20 is secured to the seat 12 with a seat belt assembly 22. The vehicle occupant 20 can be an adult, child, or infant in a car seat secured to the seat 12 with the seat belt 22. A tension force Ft is exerted on the seat belt 22 that represents the force is exerted against the occupant 20 as the belt is tightened. The occupant 20 also exerts a vertical weight force Fw against the seat bottom 18. The subject weight classification system measures the tension force Ft and the weight force Fw, determines the seat occupant weight and center of gravity, and classifies the seat occupant. The classification information is used to control deployment of a safety device, such as an airbag 24.

The airbag system 14 deploys the airbag 24 under certain collision conditions. The deployment force for the airbag 24, shown as deployed in dashed lines in FIG. 1, varies depending upon the type of occupant 20 that is belted to the seat 12. When an adult 20 is belted to the vehicle seat 12, the airbag 24 should be deployed in a normal manner shown in FIG. 1. If there is small adult or an infant in a car seat secured to the vehicle seat 12 then the airbag 24 should not be deployed or should be deployed at a significantly lower force. Thus, it is important to be able to determine whether there is an adult 20 belted to the seat 12 or whether a small adult or infant seat is secured to the seat with a seat belt 22. One way to determine this is by monitoring the tension exerted on the seat belt 22. When an adult 20 is belted to the seat, normal seat belt forces are exerted against the seat belt 22. When an infant or child seat is belted to the seat 12, high tension forces are exerted on the seat belt 22 because the seat belt 22 is overtightened to securely hold the child seat in place.

The vehicle seat 12 is mounted to a vehicle structure 26, such as the floor, in a manner well known in the art. The subject weight classification system uses a plurality of sensors, some mounted in the seat bottom 18 to measure seat occupant weight and some mounted in the seat belt assembly 22 to measure the seat belt tension force Ft. The output from the sensors that measure seat occupant weight is used to determine an initial seat occupant weight and a seat occupant center of gravity. The center of gravity information along with the output from the sensors that measure seat belt forces is used to generate a compensation factor that is used to adjust the seat occupant weight to take into account variations seat occupant position. The seat occupant is then classified into a predetermined weight classification by a method that filters out momentary events such as rough road conditions or seat occupants adjusting seat position. The preferred sensors for measuring occupant weight and seat belt forces as well as the method for classifying the seat occupants will be discussed in detail below.

Figure 2:
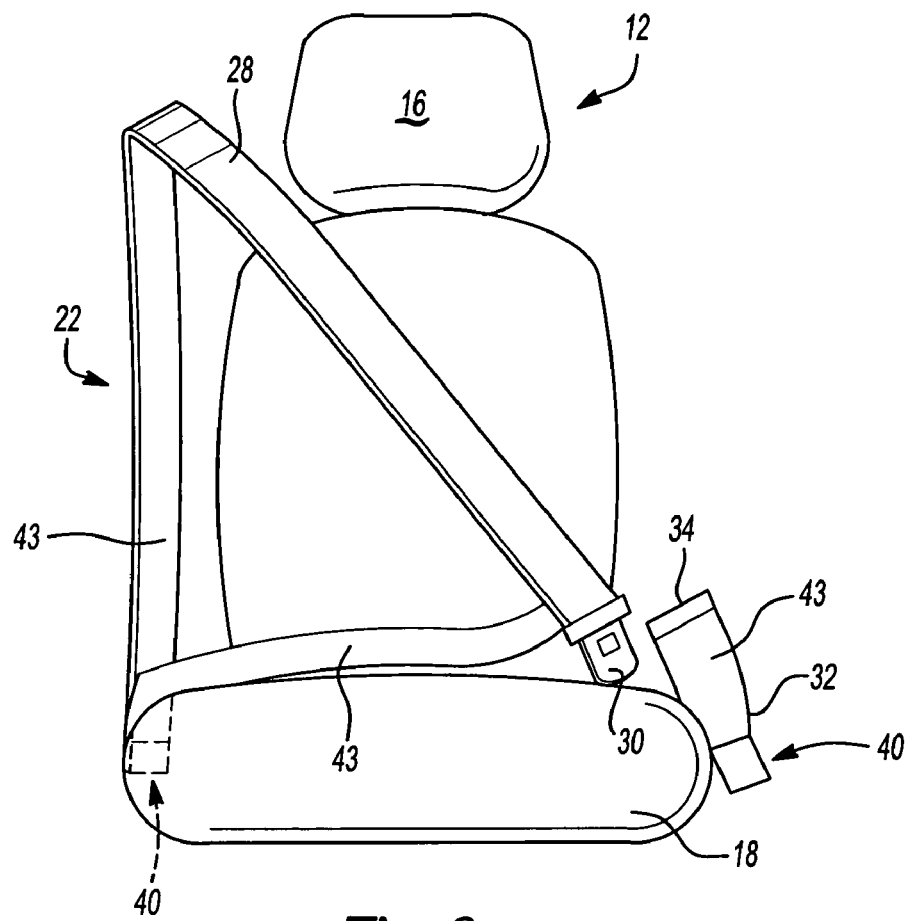
FIG. 2 is a front view of a seat and seat belt assembly showing different installed positions of the seat belt force sensor incorporating the subject invention.

The seat belt 22, shown more clearly in FIG. 2, has a strap portion 28 that includes a shoulder harness and/or lap belt that is connected to a male buckle member 30. A seat belt latch mechanism 32 is hard mounted to the seat 12 and typically extends outwardly from the seat 12 between the seat back 16 and the seat bottom 18. The latch mechanism 32 includes a female receptacle 34 that receives the male buckle member 30 to secure the occupant 20 or child seat to the seat 12. The strap portion 28 can be manually or automatically tightened once the belt is buckled to a desired tension.

Figure 3A:
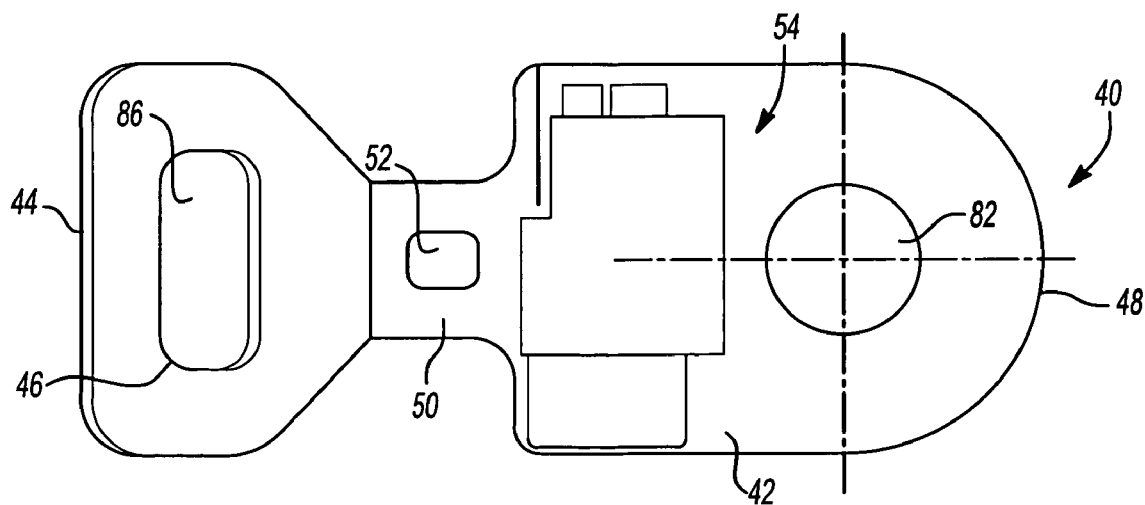
FIG. 3A is a top view of a seat belt force sensor.
Figure 3B:
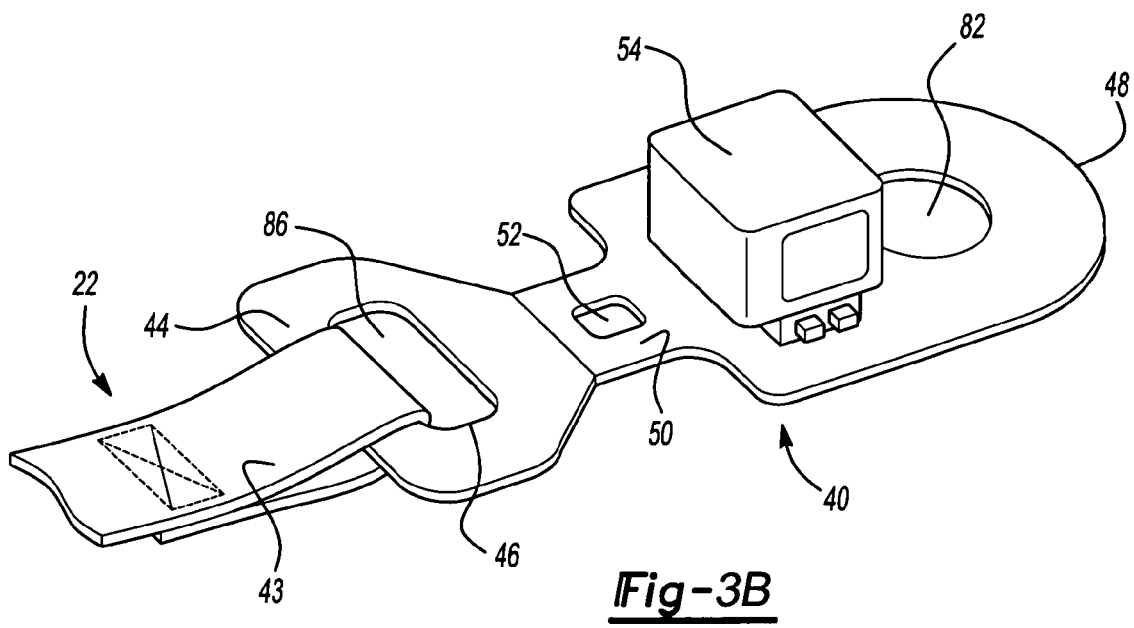
FIG. 3B is a perspective view of FIG. 3A showing the seat belt force sensor installed within a seat belt assembly.
Figure 4:
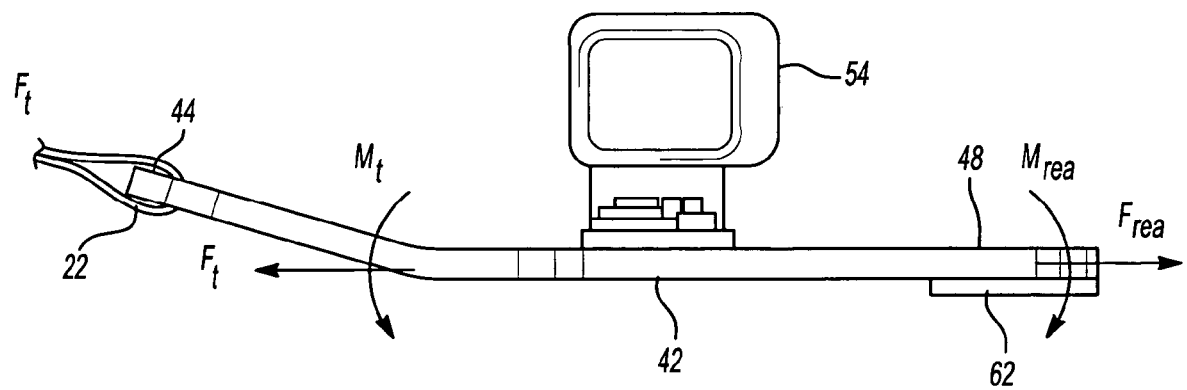
FIG. 4 is a side view of the seat belt force sensor of FIG. 3A.

A sensor assembly 40 for measuring the tension forces in the seat belt 22 is shown in FIGS. 3A-3B and 4. The sensor assembly 40 includes a rigid member that is preferably formed as a metallic plate 42 from 4130Rc39 material, however, other similar materials could also be used. The plate 42 includes a first end 44 that is attached via a ioop connection 46 to material 43 (see FIGS. 1 and 2) that forms a portion of the seat belt 22 (see FIG. 4) attached to the male buckle member 30 (as schematicafly indicated in dashed lines at 40 in FIG. 2) or female receptacle 34 (as schematically indicated in solid lines at 40 in FIG. 2), and a second end 48 that is attached to a vehicle structure such as a B-pillar or seat latch mechanism 32.

The plate 42 includes a necked portion 50 positioned between the ends 44, 48 that is narrower than the ends 44, 48. A strain gage 52 is mounted on the necked portion 50. The tightening of the seat belt 22 exerts a tension force $F_T$ on the plate 42 via the looped connection 46, which results in strain on the necked portion 50. The strain gage 52 measures this strain. The strain gage 52 is preferably a full bridge strain gage with four (4) grids.

The first end 44 of the plate 42 is preferably positioned at an angle relative to the necked portion 50 and the second end 48, shown in FIG. 4. This causes the tension force to be applied at an angle, which creates a moment MT at one edge of the necked portion 50. The second end 48 of the plate 42 is hard mounted to a vehicle structure 62 creating a reaction force Frea and moment Mrea. The strain gage 52 measures the strain resulting in the necked portion 50 of the plate 42 as the tension force FT is applied to the first end 44 of the plate 42.

Figure 5:
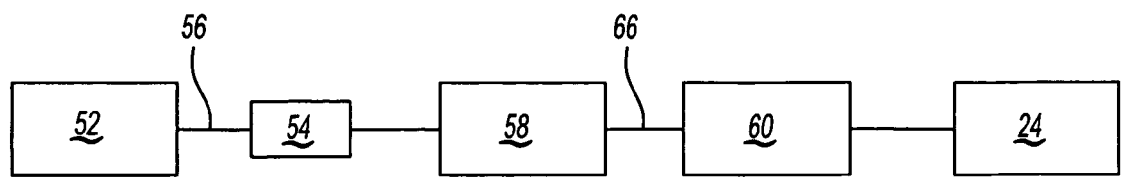
FIG. 5 is a schematic control diagram of the seat belt force sensor and control system.

An electrical connector 54 is also mounted on the plate 42 adjacent to the strain gage 52. As shown in FIG. 5, the strain measurements are generated as signals 56 that are sent from the gage 52 to the connector 54 and then to an individual electronic control unit (ECU) or microprocessor 58, see FIG. 5. The ECU 58 can be incorporated into the connector 54 to include the necessary electronics and printed circuit board (as shown in FIGS. 3A-3B) or can be a separate component at a remote location on the vehicle, as discussed below. The ECU 58 processes the strain signals 56 to determine the magnitude of the tension forces Ft exerted on the seat belt 22 and sends a seat belt force output signal 66 to a central electronic control unit (ECU) or central microprocessor 60, which uses the seat belt force signal and occupant weight measurements to classify the seat occupant and to ultimately control deployment of the airbag 24. It should be understood that the ECU 58 can be a separate unit or can be incorporated into the central ECU 60.

The strain gage 52 measures the strain caused by the tension force $F_T$ in the seat belt 22 resulting in the generate of the seat belt force output signal 66. The central ECU 60 uses the seat belt force output signal 66 to adjust or compensate the measured seat occupant weight for over-tightened seat belts. Further, the seat belt force output signal 66 can be used to identify a child seat. If the tension force $F_T$ exceeds a predetermined limit the system identifies a child seat. For example, an adult can experience a tension force in a seat belt up to approximately 30 pounds (lbs) and still be comfortable. If the strain gage 52 measures a tension force $F_T$ that exceeds 30 lbs then that would indicate that a child seat has been belted to the seat 12. Once a child seat has been identified as the seat occupant, then the airbag 24 would not be deployed during a collision. It should be understood that 30 lbs is an approximate value, which can vary due to differing seat and seatbelt configurations. Thus, the predetermined limit for comparison to the measured tension force $F_T$ can also vary depending upon the seat configuration.

Figure 6:
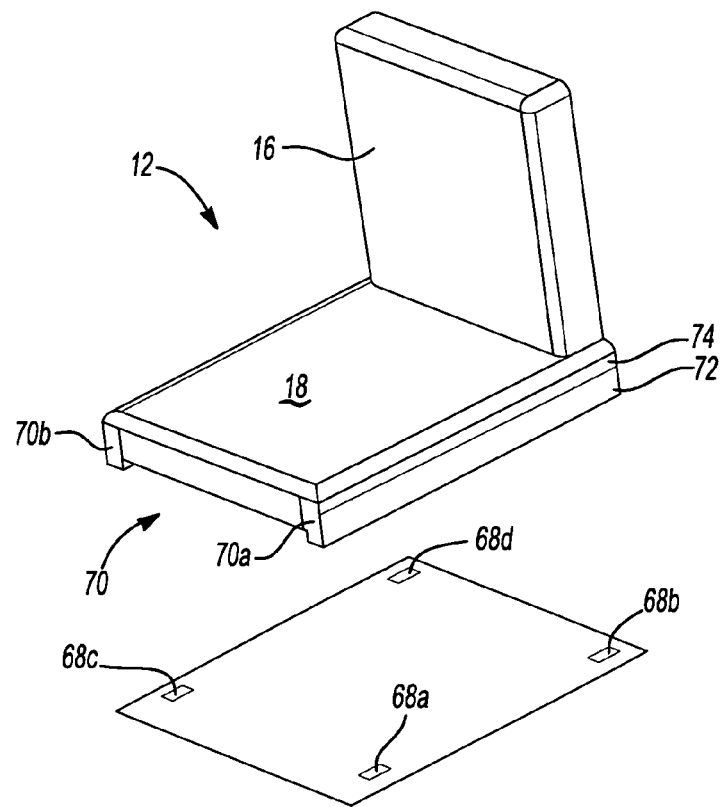
FIG. 6 is an exploded view of a seat assembly incorporation occupant weight sensors.

The sensor system for measuring seat occupant weight is shown in FIG. 6. A plurality of seat occupant weight sensors 68 are mounted to seat structural member such as a seat frame or track member, generally indicated at 70 in FIG. 6.

As discussed above, the seat 12 is preferably mounted to the vehicle structure 26 on an inboard track assembly 70a and an outboard track assembly 70b that is spaced apart from the inboard track assembly 70a by a predetermined distance. Both the inboard 70a and outboard 70b track assemblies include first 72 and second 74 track members.

The first track member 72 is typically mounted to a seat riser 76 or directly to the vehicle structure 26, such as the floor. The second track member 74 is mounted for sliding movement relative to the first track member 72 so that seat 12 position can be adjusted forwardly and rearwardly within the vehicle to a desired position.

The plurality of sensor assemblies 68 are mounted between the first track members 72 of the inboard 70a and outboard 70b track assemblies and the riser 76. In the preferred embodiment, four (4) sensor assemblies 68 are used with a first sensor assembly 68a positioned near the front of the inboard track assembly 70a, a second sensor assembly 68b positioned near the rear of the inboard track assembly 70a, a third sensor assembly 68c positioned near the front of the outboard track assembly 70b, and a fourth sensor assembly 68d positioned near the rear of the outboard track assembly 70b.

The sensor assemblies 68 are preferably installed as described above, i.e. between the lower seat track 72 and the riser 76. However, the sensor assemblies 68 can also be installed between the lower seat track 72 and a reinforced floor plan or reinforcement bracket.

Figure 7:
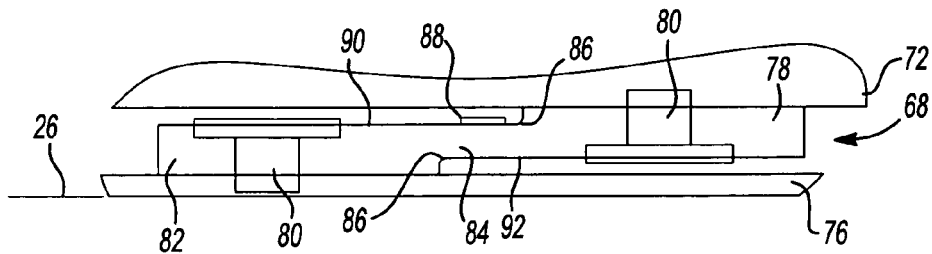
FIG. 7 is a side cross-sectional view of a weight sensor installed in a seat assembly.

Preferably, each sensor assembly 68a (left front portion of seat bottom 18), 68b (left rear portion of seat bottom 18), 68c (right front portion of seat bottom 18), and 68d (right rear portion of seat bottom 18) has a first end 78 mounted to the first track member 72 with at least one fastener 80 and a second end 82 mounted to the riser 76 with at least one fastener 80, as shown in FIG. 7. It should be understood that any type of fastener can be used and that other joining methods known in the art can also be used to mount the sensors 68, however, M10 fasteners are preferred. A central bendable portion 84 extends between the first 78 and second 82 ends of the sensor assembly 68. As the vertical force Fw of the seat occupant 20 is exerted on the seat bottom 18, the central bendable portion 84 of each sensor assembly 68a, 68b, 68c, 68d deflects or bends into an S-shaped configuration putting one portion of the sensor 68 in compression and another portion in tension.

Figure 8:
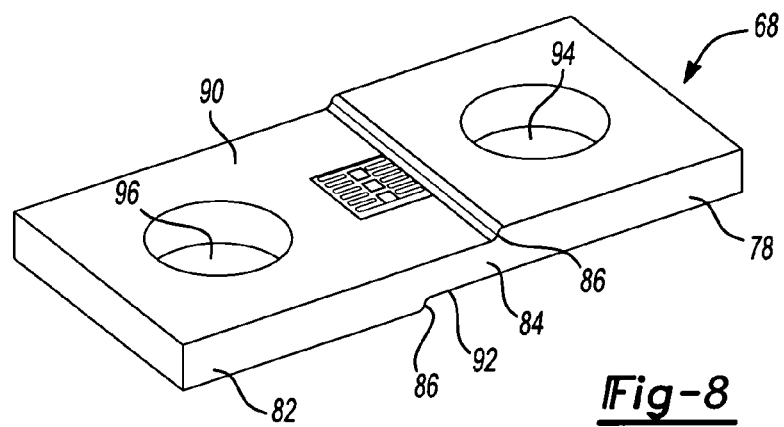
FIG. 8 is a perspective view of the weight sensor of FIG. 7.

As shown in FIGS. 7 and 8, the first 78 and second 82 ends are raised above/below the central bendable portion 84 to form steps 86 on each side of the central bendable portion 84. The height of the steps 86 can be varied. This configuration forms gaps between the sensor 68 and the track member 72 and between the sensor 68 and the riser 76 to facilitate bending.

A strain gage 88 is mounted to each of the sensors 68a, 68b, 68c, 68d to measure the amount of bending in the central portion 84. The sensors 68 have a top surface 90 facing the seat bottom 18 and a bottom surface 92 facing the riser 76. Preferably, a combination of four (4) strain gages, forming a full bridge, are mounted on one of the top 90 or bottom 92 surfaces to measure the bending. The four strain gates are thus combined to serve as a Wheatstone Bridge for measuring deflection. The operation of a Wheatstone Bridge is well known in the art.

As shown in FIG. 8, the strain gage 88 is mounted on the top surface 90 of the sensor 68. A first aperture 94 is formed at the first end 78 of the sensor 68 and a second aperture 96 is formed at the second end 82 of the sensor 68 for receiving the fasteners 80. The strain gage 88 is positioned between the apertures 94, 96 on the top surface 90. In order to achieve more accurate readings, full-bridge strain gage 88 should have all strain gage components mounted on only one surface of the sensor 68. In other words, if the strain gage 88 is mounted on the top surface 90 then no strain gage components should be mounted on the bottom surface 92 or if the gage 88 is mounted on the bottom surface 92, then no strain gage components should be mounted on the top surface 90.

Preferably, the sensors 68 are capable of a measuring range of −100 kilograms to +100 kilograms with a resolution of 0.1 kilograms. Further the sensors 68 are preferably designed to withstand 1500 pounds of force without performance degradation.

The sensors 68a, 68b, 68c, 68d each generate a signal representative of the occupant weight that causes bending at the respective location of the sensors 68a, 68b, 68c, 68d, see FIG. 9. Thus, the first sensor 68a generates a first signal 100, the second sensor 68b generates a second signal 102, the third sensor 68c generates a third signal 104, and the fourth sensor 68d generates a fourth signal 106. The signals 100, 102, 104, 106 are transmitted to a common interface unit 108 and are then fed into the central processor unit or electronic control unit (ECU) 60 as is known in the art. The sensors 68a, 68b, 68c, 68d output an amplified and digitized signal to the ECU 60 for final signal conditioning. The ECU 60 combines the signals 100, 102, 104, 106 to determine the total weight of the occupant 20.

The sensors 68 can be susceptible to errors that can distort the weight measurement. Changes in temperature can result in base material expansion, resistance changes, and bonding changes. Further there can be initial offset error and part-to-part variation between the bendable portion 84 and the strain gage 88 can affect gain. To reduce these errors, the strain gage 88 is preferably encapsulated, and the bendable portion 84 is designed to provide as much signal output as possible, the design of which will be discussed in further detail below.

Figure 10C:
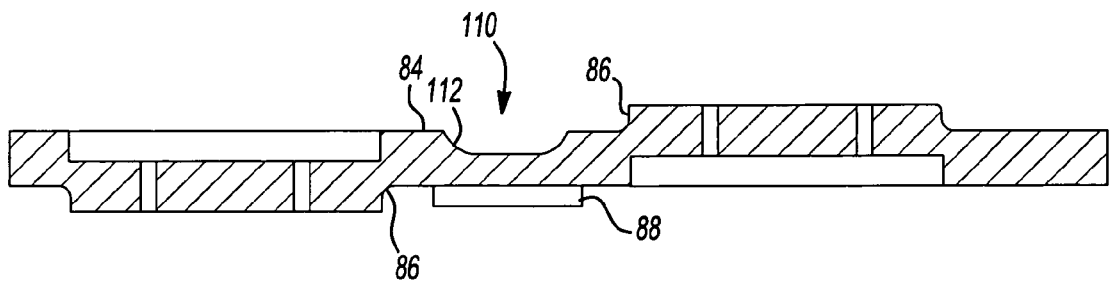
FIG. 10C is a side view of the weight sensor of FIG. 10A.
Figure 10D:
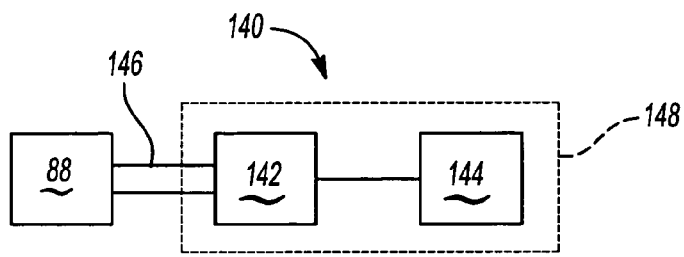
FIG. 10D is a schematic diagram of an electronics package for a weight sensor.

Each sensor 68 includes an electronics package 140 that has a flexible printed circuit board (PCB) 142 and an application specific integrated circuit (ASIC) 144, shown in FIG. 10D. This package 140 can be used with the sensor 110 shown in FIGS. 10A-D or the sensor 68 shown in FIGS. 7 and 8. To further reduce sensor error, decoupling and differential capacitance is provided at the PCB 142. The sensor signal conditioning ASIC 144 is used to provide initial offset compensation and to measure temperature for temperature compensation in the ECU 60. In additional to these features, the ASIC 144 provides amplification, signal analog to digital conversion, compensation parameter storage, serial communication of load signal, and diagnostics.

Each sensor 68 and electronics package 140 is preferably assembled in the following manner. The surface of the sensor 68 is prepped. Cables are bonded in a flexible-strip connector 146, which is attached to the strain gage 88. The flexible-strip connector 146 and strain gage 88 are bonded to the bendable portion 84. The flexible-strip connector 146 is soldered to a housing 148 that surrounds the PCB 142 and ASIC 144. The strain gage 88 is preconditioned as is known in the art and the PCB 142 is attached into the housing 148 with press-fit pins (not shown). A cover (not shown) is welded onto the housing 148 and the sensor 68 is calibrated.

As discussed above, the ECU 60 combines the weight sensor signals 100, 102, 104, 106 to determine the total weight of the occupant 20. The left front sensor 68a and the right front sensor 68c are combined to determine a front weight portion and the left rear sensor 68b and right rear sensor 68d are combined to determine a rear weight portion. The front and rear weight portions are compared to determine the center of gravity. The total weight of the seat occupant 20 can then be adjusted by the ECU 60 to account for variations due to the center of gravity position of the occupant. Further the ECU 60 can adjust or compensate for seat belt forces acting on the seat occupant 20 as discussed above.

A preferred embodiment of a weight sensor 110 is shown in FIGS. 10A-10C. In this preferred embodiment, each of the sensor assemblies 110a, 110b, 110c, 110d includes at least one groove 112 formed in one of the top 90 or bottom 94 surfaces of the sensor 110. The groove 112 extends at least partially along the width of the sensor assembly 68 to localize strain in the central bendable portion 84. The full bridge strain gage 88 is placed on the opposing surface, facing an opposite direction from the groove 112, see FIG. 10B. As shown, the groove 112 preferably extends across the entire width of the sensor 68.

By measuring the deflection in all four (4) locations in the inboard 70a and outboard 70b track assemblies, it is possible to calculate the occupant weight, which is proportional to the sum of the output of all of the sensors 68a, 68b, 68c, 68d. The electronics for signal conditioning and the interface 108 can be housed within the track assemblies 70a, 70b as is well known in the art.

Once the weight and seatbelt forces have been measured, the occupant 20 is placed into a weight classification. The weight signals 100, 102, 104, 106 are combined and initially represent an estimated weight signal 114 for the occupant 20. The ECU 60 compares the weight signal 114 to a series of weight classes each having at least one threshold value, assigns a weight class designation to the occupant 20, and generates an output control signal 116 that controls and modifies deployment of the airbag 24 based on the weight classification. The classification process will be discussed in greater detail below.

The weight sensors 68 are preferably calibrated prior to installation. Mounting the seat 12 in the vehicle induces stresses in the seat track assemblies 26 that are then seen in the sensors 68. These stresses can vary from seat to seat and represent an offset value. During system diagnostics, the sensors 68 can be re-calibrated. To re-calibrate, the seat 12 must be empty. Once sensor output is stabilized, the zero values are then restored. This procedure can also be used to compensate for sensor wear that occurs over time.

Figure 14:
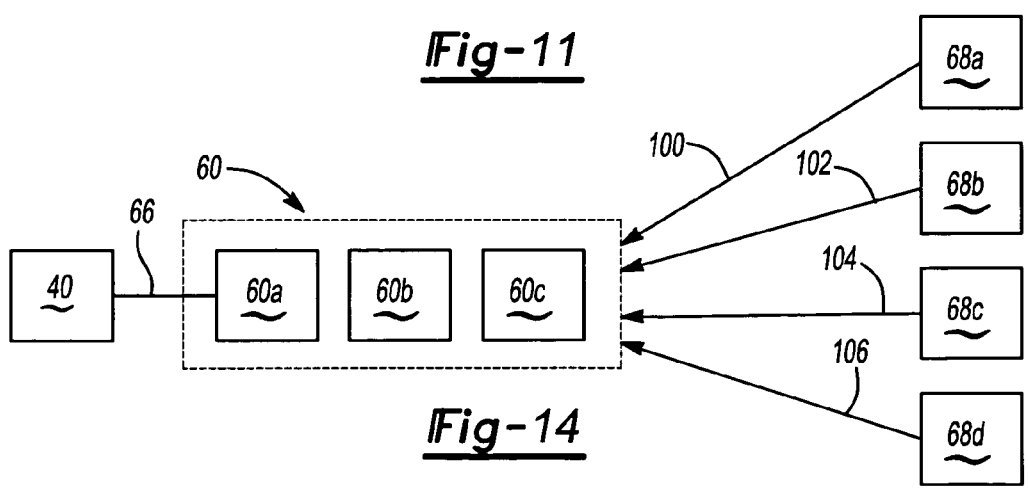
FIG. 14 is a schematic diagram of an ECU used in the control system.

As discussed above, the ECU 60 (shown schematically in FIG. 14) receives signals from the weight sensors 68 and the seat belt force sensor 40 and uses this information to classify seat occupants 20. The ECU 60 includes three (3) main sections: power regulation 60a, microprocessing 60b, and communication 60c. The signals 66, 100, 102, 104, 106 are received and processed by the ECU 60 to make an approximation of the weight classification. After the ECU 60 makes a determination, a message is placed on a communications bus for the vehicle to use properly. Diagnostics are periodically performed to check the functionality of such components as the microprocessor, the sensors 40, 68, communication bus, input voltage, etc., for example.

After power down, the ECU 60 preferably stays alive to perform system calibration to adjust for offset that may occur over time. The ECU 60 can put itself and the sensors 40, 68 to sleep after calibrations are completed to conserve vehicle energy.

Figure 15A:
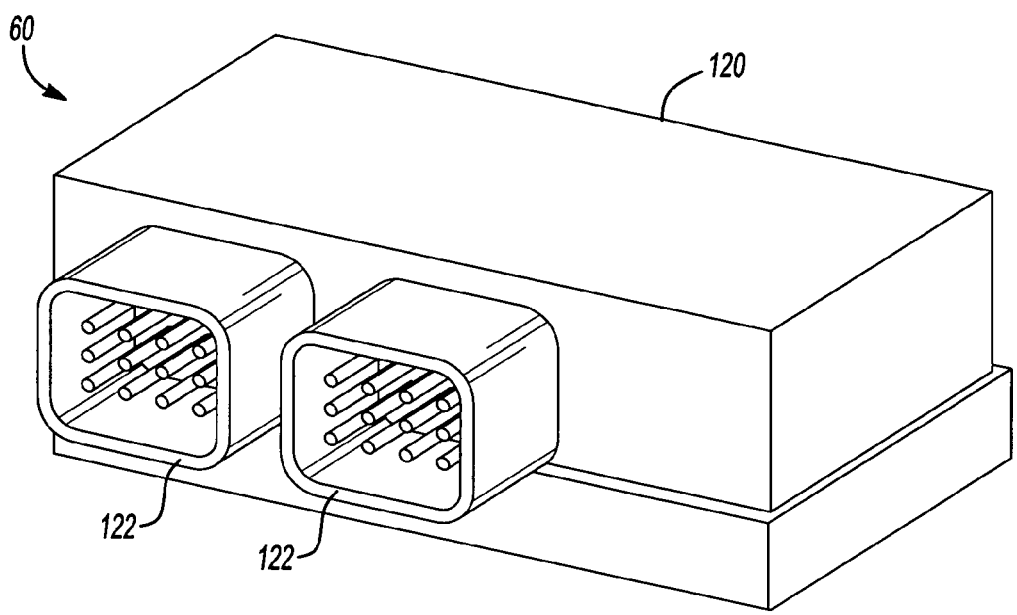
FIG. 15A is perspective view of the ECU.
Figure 15B:
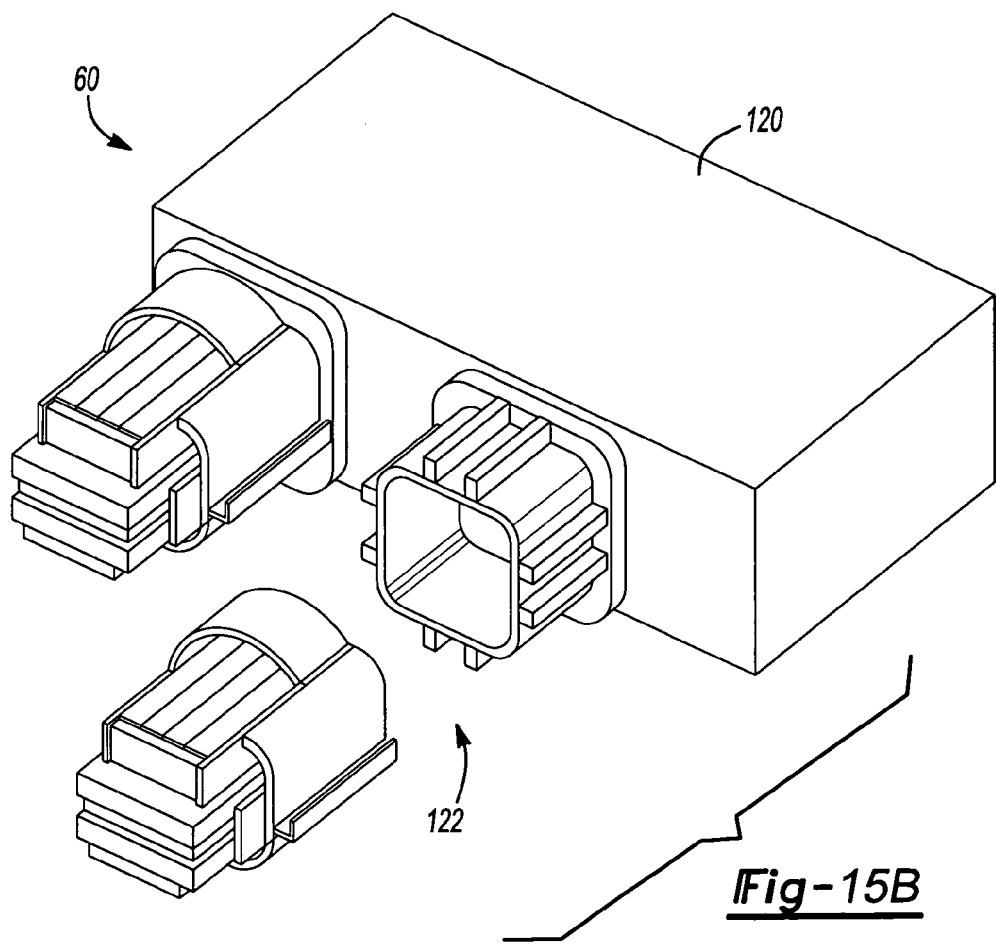
FIG. 15B is a perspective of the ECU of FIG. 15A from an opposing side.

As shown in FIGS. 15A and 15B, the ECU 60 preferably includes a plastic housing 120 with integrated insert molded sealed connectors 122 for attachment/connection to the sensors 40, 68. These types of connectors 122 simplify installation and interface connections.

The weight measurements taken by the sensors 68 can vary as the occupant 20 changes seating positions and can vary as the vehicle travels through various maneuvers and over different types of roads. In order to provide a consistent and accurate weight classification, the classification process must filter out these variations. The subject invention monitors the occupant's estimated weight and compares the estimated weight to a series of weight class thresholds to determine an individual classification sample. A history of these class samples is observed and recorded by the ECU 60. Once a predetermined number of consistent and consecutive samples are observed, the class sample is locked as the occupant's weight class. Over time, a plurality of comparisons are made between the estimated weight and the weight class thresholds.

Each weight class is assigned a predetermined upper threshold and a predetermined lower threshold. The number and values for the upper and lower thresholds can be varied. Each weight class sample is determined by comparing the occupant's estimated weight against the previous weight class sample's thresholds. If the estimated weight falls between the upper and lower thresholds for that previous class, the current class sample is set to that last sample. If the estimated weight does not fall between the upper and lower thresholds for that previous class, either the weight class above or the weight class below the previous weight class is set for the current weight class depending on which threshold is crossed. Preferably, only one incremental weight class change is permitted for each iteration. Allowing a change of only one class per iteration helps to smooth the transition between the classes.

Figure 11:
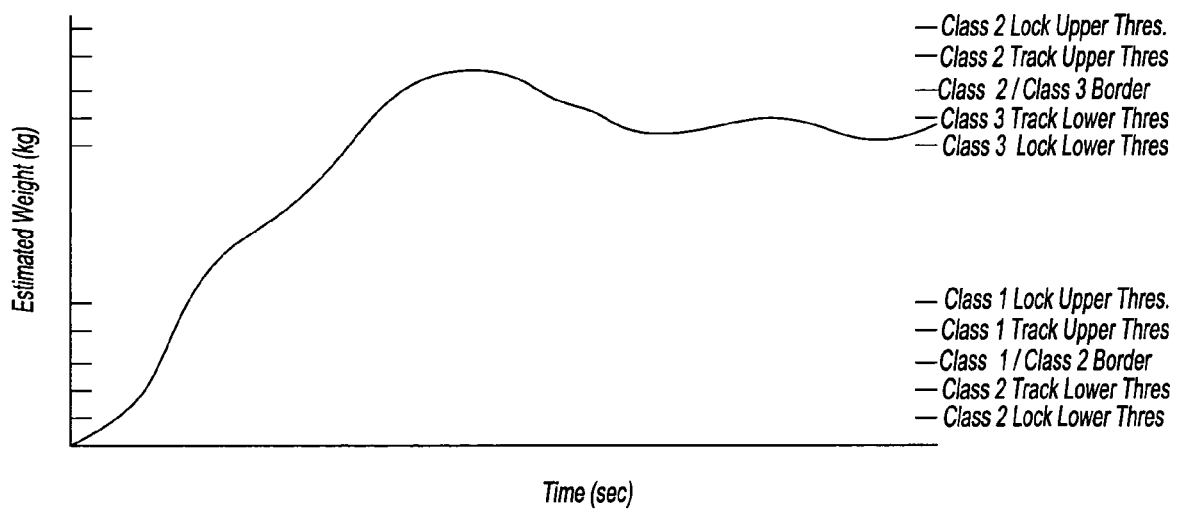
FIG. 11 is a graph showing the relationship between track and lock thresholds.

The upper and lower thresholds for each class varies depending on whether the process is in the track mode or the lock mode. If the system is locked onto a specific weight class, the separation between the upper and lower thresholds for that weight class is increased to provide more hysteresis. By increasing the hysteresis when locked, it is more difficult to change or unlock the weight class designation. This helps to filter out unintended weight class changes, i.e., error induced by adverse road conditions or changes in occupant seating position. FIG. 11 shows the relationship between the track and lock thresholds. Note that the track upper and lower thresholds for weight class two (2) are closer together than the lock upper and lower thresholds for weight class two (2). Thus, the upper threshold for weight class (2) is increased and the lower threshold is decreased when class (2) is the locked class.

Figure 12:
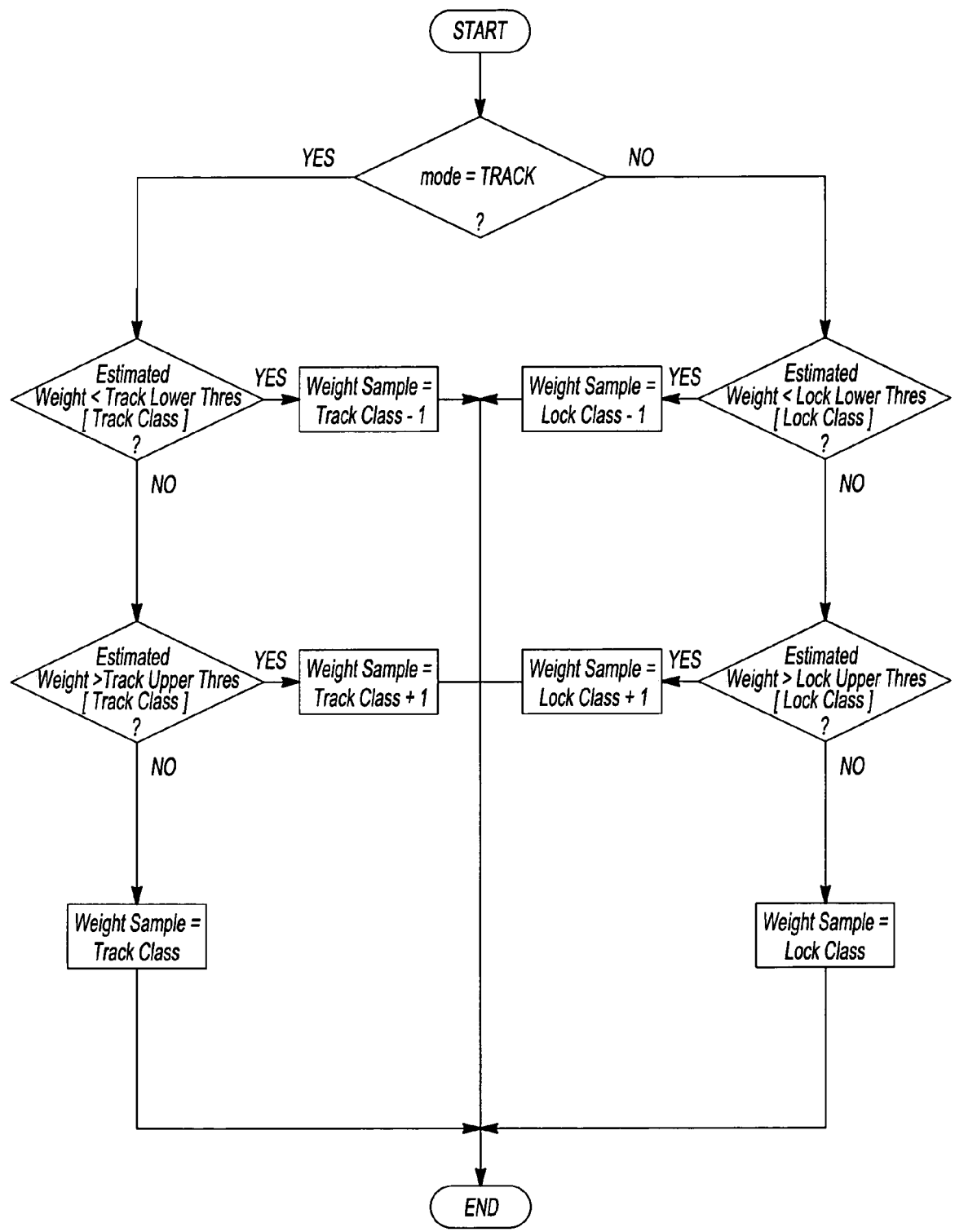
FIG. 12 is a flowchart describing the method of determining a weight class sample.

FIG. 12 is a flow chart showing the process for determining the current weight class sample. When the process is started, there is a determination of whether the process is in the track or lock mode. If the process is in the track mode than the current estimated weight is compared to the previous class' track lower threshold. If the current estimated weight is less than the previous class' track lower threshold than the next lower weight class is set as the current weight class. If the current estimated weight is not less than the previous class' track lower threshold than the estimated weight is compared to the previous class' track upper threshold. If the current estimated weight is greater than the previous class' track upper threshold than the next higher weight class is set as the current weight class. If the current estimated weight is not greater than the previous class' track upper threshold than the current weight class is the same as the previous weight class. A similar method is used when the process is in the lock mode except the current estimated weight is compared to the previous class' lock upper and lower thresholds.

Figure 13:
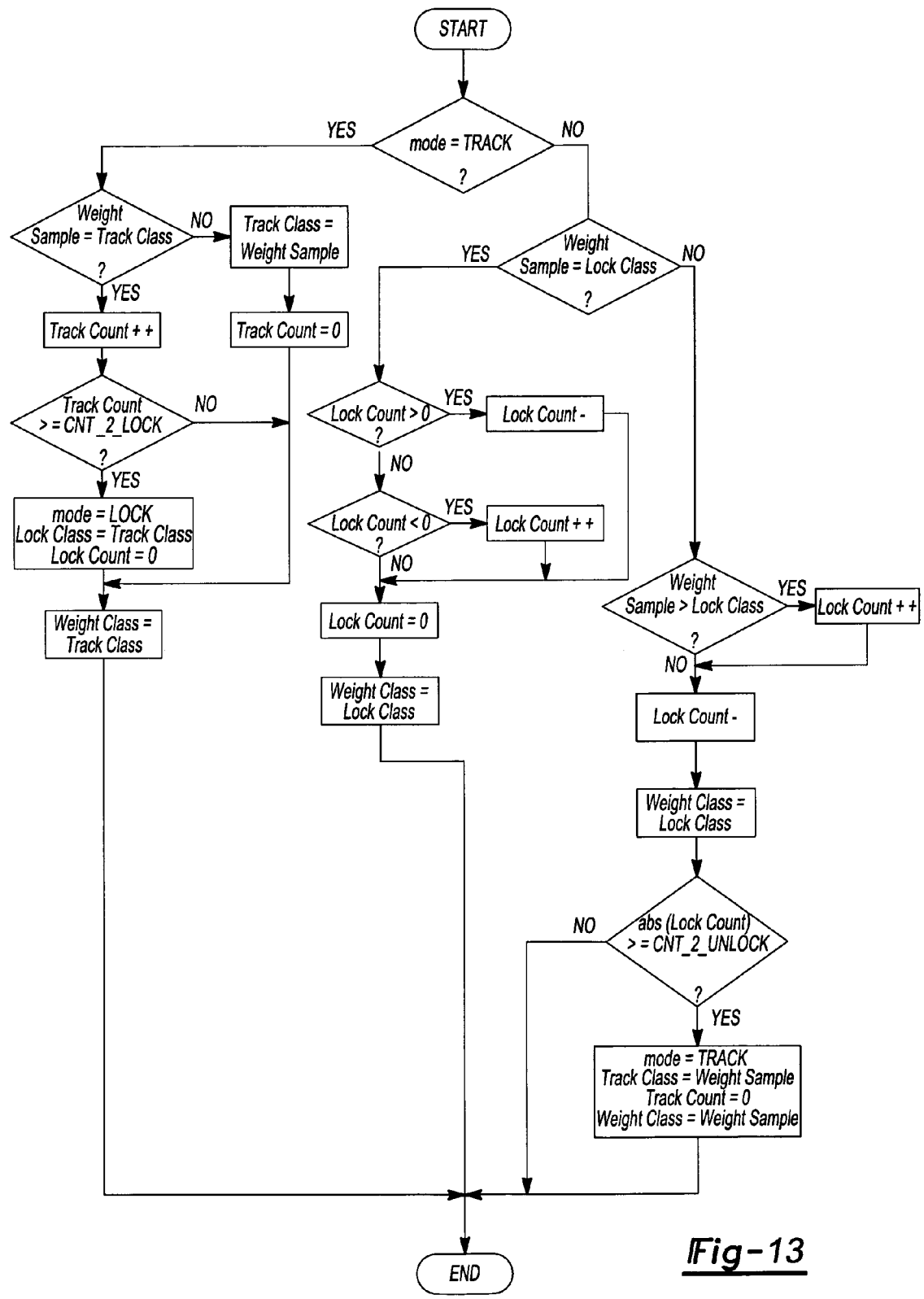
FIG. 13 is a flowchart describing the tracking and locking processes.

As the process moves through each iteration, a history of the comparisons between the estimated weight and the weight class thresholds is observed and recorded, see FIG. 13. The weight class samples are monitored, looking for the same class sample to be repeated. The process starts counting or tracks consecutive samples of the same weight class. If a non-consistent sample is observed, the count is reset to zero. When a predetermined number of consistent and consecutive samples is observed, that observed weight class becomes locked. Once a class is locked, it remains the designated occupant weight class until a specific number of consecutive weight class samples above or below the locked class is observed. If the lock is lost, the process starts tracking the number of consecutive weight classes again and the process is repeated. The output is either the tracked or locked weight class, depending on the mode. If a class is locked, the locked class is the output class. If a class is not locked, the track weight class is the output class. The track/lock feature helps to filter out class changes caused by occupants 20 that change position, class changes caused by adverse road conditions, and class changes resulting from sudden vehicle maneuvers such as turning or braking.

Preferably, the class update rate is approximately one update every second and the weight class locking delay is at least five (5) seconds. Preferably the locking delay is approximately between five (5) and seven (7) seconds. This delay period filters out momentary events that may transfer or remove weight from the seat, e.g., due to rough road conditions or seat occupant body movements. These momentary events are typically important for borderline cases. If the same weight class is calculated for five to seven seconds the class is locked. This widens the window for the determination of the current weight class. A weight outside of the window must be maintained for five to seven seconds to unlock and change the weight class. These times can be adjusted through calibration. An unlocked system can change weight classes every second. While these are the preferred time periods, it should be understood that these time periods could vary depending on the application.

Figure 16:
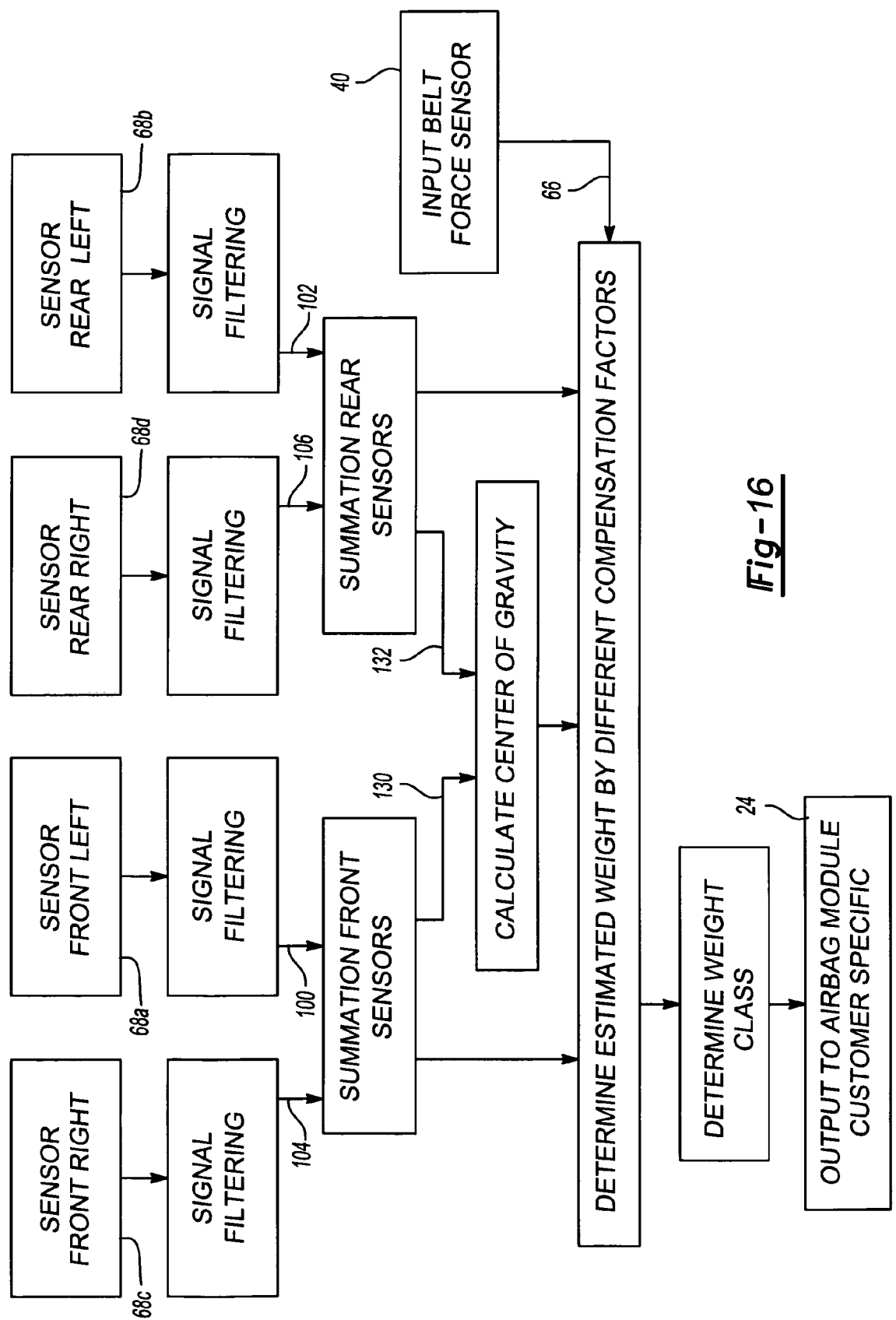
FIG. 16 is a flowchart describing the overall control system operation.

A flowchart summarizing the weight classification system is shown in FIG. 16. The weight sensors 68a-d generate weight signals 102-106 that are proportionate to the weight exerted against the seat bottom 18 at the respective sensor location. The front sensors 68a, 68c are combined to determine a front weight portion signal 130 and the rear sensors 68b, 68d are combined to determine a rear weight portion signal 132. The front 130 and rear 132 weight portion signals are compared to determine a center of gravity. An estimated seat occupant weight is then determined by using various compensation factors including information from the seat belt force sensor 40, center of gravity, and combined weight information from all weight sensors 68a-d. This adjusted weight designation is then used to classify the seat occupant by a process discussed above.

The number of classes and thresholds can be correlated to predetermined requirements that vary according to different specifications and vehicle types. One example of a set of weight classes is as follows. If the weight determination is less than 8 kilograms the seat is determined to be empty, if the weight determination is between 8 and 30 kilograms the system indicates a child is the seat occupant, if the weight determination is between 30 and 60 kilograms the system indicates a small adult is the seat occupant, and if the weight determination is greater than 60 kilograms the system indicates a large adult is the seat occupant.

Although a preferred embodiment of this invention has been disclosed, it should be understood that a worker of ordinary skill in the art would recognize many modifications come within the scope of this invention. For that reason, the following claims should be studied to determine the true scope and content of this invention.

We claim:

1. A vehicle weight classification system comprising:
   a seat assembly having a seat frame for supporting a seat bottom;
   a seat belt assembly for securing a seat occupant to said seat assembly;
   a rigid member attached to said seat belt assembly, said rigid member comprising a single-piece component having a first end for supporting a seat belt portion and a second end integrally formed with said first end for attachment to a vehicle structure;
   a plurality of weight sensors mounted to said seat frame for generating a plurality of weight signals in response to a weight force applied to said seat bottom;
   at least one seat belt force sensor for generating a seat belt force signal, said seat belt force sensor being mounted directly to said rigid member between said first and second ends for measuring a force exerted on said rigid member by a tension force applied to said seat belt portion;
   an electronic control unit for receiving said weight signals and seat belt force signals to determine occupant weight and center of gravity, generating an occupant classification based on said occupant weight and center of gravity, and transmitting an output control signal based on said occupant classification; and
   an airbag module for receiving said output control signal to control airbag deployment based on said occupant classification.

2. A system according to claim 1 wherein said seat assembly includes a seat mount for attachment to a vehicle floor and said plurality of weight sensors comprises a first sensor mounted at a front right side corner of said seat bottom between said seat frame and said seat mount, a second sensor mounted at a front left side corner of said seat bottom between said seat frame and said seat mount, a third sensor mounted at a rear right side corner of said seat bottom between said seat frame and said seat mount, and a fourth sensor mounted at a rear left side corner of said seat bottom between said seat frame and said seat mount.

3. A vehicle weight classification system comprising:
   a seat assembly having a seat frame for supporting a seat bottom;
   a seat belt assembly for securing a seat occupant to said seat assembly;
   a rigid member comprising a single-piece component having a body portion, a first end for supporting a seat belt portion of said seat belt assembly and a second end adapted for attachment to a fixed structure wherein said first and second ends are integrally formed with said body portion;
   a plurality of weight sensors mounted to said seat frame for generating a plurality of weight signals in response to a weight force applied to said seat bottom;
   at least one seat belt force sensor for generating a seat belt force signal, said seat belt force sensor being mounted on said body portion of said rigid member between said first and second ends for measuring a force exerted on said rigid member by a tension force applied to said seat belt portion; and
   an electronic control unit for receiving said weight signals and seat belt force signals to determine occupant weight and center of gravity, generating an occupant classification based on said occupant weight and center of gravity, and transmitting an output control signal based on said occupant classification to control airbag deployment based on said occupant classification.

4. A system according to claim 1 wherein said first end includes a first opening to receive a portion of seat belt material in a looped connection, and wherein said second end includes a second opening to receive a fastener to secure said rigid member to the vehicle structure.

5. A system according to claim 4 wherein said first and second ends are non-coplanar.

6. A system according to claim 1 wherein said first end of said rigid member extends at an oblique angle relative to said second end of said rigid member.

7. A system according to claim 1 wherein said rigid member comprises a single plate with said at least one seat belt force sensor being directly mounted to said single plate.

8. A system according to claim 7 wherein said single plate includes a narrowing neck portion to which said at least one seat belt force sensor is mounted.

9. A system according to claim 3 wherein said single-piece component comprises a single plate with said at least one seat belt force sensor being directly mounted to said single plate.

10. A system according to claim 9 wherein said single plate includes a narrowing neck portion that supports said at least one seat belt force sensor.

11. A system according to claim 9 wherein said first end of said single plate extends at an oblique angle relative to said second end of said single plate.

12. A system according to claim 1 wherein said second end is to be directly attached to the vehicle structure.

13. A system according to claim 1 wherein said rigid member has a first surface to face the vehicle structure and a second surface facing opposite said first surface, and wherein said at least one seat belt force sensor is mounted to said second surface.

14. A system according to claim 13 wherein said rigid member includes a first opening to receive said seat belt assembly and a second opening to receive a fastener for attachment to the vehicle structure, and wherein said at least one seat belt force sensor is centrally positioned on said second surface and spaced apart from said first and said second openings.

15. A system according to claim 3 wherein said second end is to be directly attached to the fixed structure.

16. A system according to claim 3 wherein said body portion has a first surface to face the fixed structure and a second surface facing opposite said first surface, and wherein said at least one seat belt force sensor is mounted to said second surface.

17. A system according to claim 16 wherein said body portion includes a first opening at said first end to receive the seat belt portion and a second opening at said second end to receive a fastener for attachment to the fixed structure, and wherein said at least one seat belt force sensor is centrally positioned on said second surface and spaced apart from said first and said second openings.

* * * * *